(12) United States Patent
Nichols

(10) Patent No.: US 6,363,073 B2
(45) Date of Patent: *Mar. 26, 2002

(54) CIRCUIT AND METHOD FOR SERVICE CLOCK RECOVERY

(75) Inventor: Richard Allen Nichols, Richardson, TX (US)

(73) Assignee: ADC Telecommunications, Inc., Minnetonka, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/727,245

(22) Filed: Nov. 30, 2000

Related U.S. Application Data

(63) Continuation of application No. 09/013,644, filed on Jan. 26, 1998, now Pat. No. 6,157,646.

(51) Int. Cl.[7] .............................................. H04L 12/28
(52) U.S. Cl. ............................................. 370/395; 375/376
(58) Field of Search ....................... 370/395, 518–520, 370/516, 473–474, 400, 509, 500; 375/376, 372, 371, 354

(56) References Cited

U.S. PATENT DOCUMENTS

| | | |
|---|---|---|
| 4,961,188 A | 10/1990 | Lau |
| 5,007,070 A | 4/1991 | Chao et al. |
| 5,204,882 A | 4/1993 | Chao et al. |
| 5,260,978 A | 11/1993 | Fleischer et al. |
| 5,396,492 A | 3/1995 | Lien |
| 5,608,731 A | 3/1997 | Upp et al. |
| 6,011,823 A | 2/2000 | Bleiweiss et al. |
| 6,111,878 A | 8/2000 | Powell |
| 6,157,646 A | * 12/2000 | Nichols ................. 370/395 |

FOREIGN PATENT DOCUMENTS

| | | |
|---|---|---|
| EP | 0705000 | 4/1996 |
| EP | 0800326 | 10/1997 |
| FR | 2746230 | 9/1987 |
| WO | WO95/33320 | 12/1995 |

OTHER PUBLICATIONS

Lau et al., "Synchronous Techniques for Timing Recovery in BISDN," *IEEE Transaction on Communications*, 1810–1818 (Mar./Apr. 1995).

* cited by examiner

*Primary Examiner*—Wellington Chin
*Assistant Examiner*—Prenell Jones
(74) *Attorney, Agent, or Firm*—Fogg Slifer & Polglaze, P.A.

(57) ABSTRACT

A circuit and method for synchronizing a service clock at a destination node with a service clock at a source node for circuit emulation service over a packet network. The method includes receiving data packets from a source node at at least one port of the destination node. At the destination node, the method removes from the data packets residual time stamp (RTS) values that were created at the source node based on at least the service clock at the source node. RTS values are stored in memory at the destination node. The method determines a majority count and a minority count of RTS values over a period of time from the RTS values stored in memory. The method further uses the majority and minority counts to set the frequency of a service clock at the destination node for use in receiving data packets.

37 Claims, 1 Drawing Sheet

CIRCUIT AND METHOD FOR SERVICE CLOCK RECOVERY

This is a continuation of application Ser. No. 09/013,644, filed Jan. 26, 1998, now U.S. Pat. No. 6,157,646, which is incorporated herein by reference.

TECHNICAL FIELD OF THE INVENTION

The present invention relates generally to the field of telecommunications and, in particular, to a circuit and method for service clock recovery.

BACKGROUND OF THE INVENTION

Asynchronous Transfer Mode (ATM) is a packet oriented technology which permits continuous bit rate signals carrying one or more of voice, video, and data, to be conveyed across a broadband network within packets. ATM is suitable for the transport of bursty traffic such as data, as well as accommodating constant or continuous bit rate signals. In delivering continuous bit rate traffic (e.g., T1, DS3 signals) in a broadband network, a service clock controlling a destination node buffer must operate at a frequency precisely matched to that of a service clock at a source node in order to avoid buffer overflow or underflow and resulting loss of data.

One problem with synchronizing the service clock at the destination node with the service clock at the source node is "cell jitter" that is inherent in the use of an ATM network. Cell jitter is the random delay and a periodic arrival of cells at a destination node. In other words, cell jitter means that all of the cells or packets that travel between a source node and a destination node do not take the same amount of time to travel through the ATM network. Thus, it is difficult to use the cell arrival times to directly synchronize the frequency of the service clock at the destination node with the service clock at the source node.

Numerous schemes have been proposed to provide a mechanism for synchronizing the service clocks of source and destination nodes in the presence of cell jitter. This is also referred to as "service clock recovery." Descriptions of many of these schemes are provided in Fleischer et al. U.S. Pat. No. 5,260,978 (the '978 Patent). The '978 Patent incorporated by reference. Perhaps the most elegant and widely accepted of the service clock recovery schemes is known as synchronous residual time stamp (SRTS or RTS) encoding. SRTS encoding is specified, for example, in T1.630, Annex A for delivering T1 service over an ATM network.

The '978 Patent describes one embodiment of SRTS encoding. A free running four bit counter is used at the source node to count cycles of a common network clock. At the end of every residual time stamp (RTS) time period formed by 3008 service clock cycles (i.e., eight cells of forty-seven bytes of data each), the current four bit count of the four bit counter is transmitted in the ATM adaptation layer (AAL1) by using one bit in every other byte of the AAL1 for eight cells. It should be noted that the AAL1 is the overhead byte which accompanies the forty-seven bytes of data to constitute the forty-eight-byte payload of an ATM cell. The ATM cell also includes five additional bytes of header. The four-bit SRTS provides sufficient information for unambiguously representing the number of network clock cycles within a predetermined range.

The clock recovery at the destination node according to the '978 Patent involves determining from the received RTSs the number of network clock cycles in each RTS period, and generating a pulse signal from the network clock in which the period of the pulse equals the determined number of network clock cycles in the corresponding RTS period. The pulse frequency is then multiplied by 3008 in order to recover the source node service clock.

While the clock recovery mechanism of the '978 Patent might be suitable for recovering the source node service clock, it is neither the only recovery mechanism possible, nor necessarily the most optimal mechanism for recovering the source node service clock.

U.S. Pat. No. 5,608,731, entitled Closed Loop Clock Recovery for Synchronous Residual Time Stamp (the '731 Patent) describes another service clock recovery technique using SRTS. The '731 Patent describes an apparatus with a digitally controlled oscillator at the destination node. A local RTS-related value is generated at the destination node based on the output of the digitally controlled oscillator. RTS values from incoming data packets are compared to the local RTS-related values generated at the destination node. This provides a feedback error or control signal. The control signal is used to adjust the digitally controlled oscillator at the destination node. With the feedback loop as provided, when the destination node clock is faster than the source clock, the error signal will cause the destination node clock to slow, and vice versa. Unfortunately, the complex circuitry used in this closed loop must be replicated for each port at the destination node. Further, this closed loop solution suffers from problems common to closed loop control circuits.

For the reasons stated above, and for other reasons stated below which will become apparent to those skilled in the art upon reading and understanding the present specification, there is a need in the art for an improved circuit and method for service clock recovery.

SUMMARY OF THE INVENTION

The above mentioned problems with service clock recovery in a telecommunications network using asynchronous transfer mode and other problems are addressed by the present invention and which will be understood by reading and studying the following specification. A circuit and method for service clock recovery is described which uses a direct digital synthesis (DDS) circuit that is set based on analysis of a large sample of RTS values. Further, buffer fill levels at the destination node arm simultaneously monitored and information derived from this data is used to adjust the setting of the DDS circuit, at an optimum buffer fill level.

In particular, one embodiment of the present invention provides a method for synchronizing a service clock at a destination node with a service clock at a source node for circuit emulation service over a packet network. The method includes receiving data packets from a source node at at least one port of the destination node. At the destination node, the method removes from the data packets residual time stamp (RTS) values that were created at the source node based on at least the service clock at the source node. RTS values are stored in memory at the destination node. The method determines a majority count and a minority count of RTS values over a period of time from the RTS values stored in memory. The method further uses the majority and minority counts to set the frequency of a service clock at the destination node for use in receiving data packets.

In another embodiment, a method for synchronizing a service clock at a destination node in a packet switch network is provided. The packets are transmitted from a source node to a destination node. The source node calculates and transmits residual time stamp (RTS) values in the data packets. RTS values are removed from data packets at the destination node. The RTS values are stored in a memory. The RTS values stored over a period of time are used to set a direct digital synthesis circuit to act as the service clock for the destination node with a frequency that is substantially synchronized with a service clock at the source node.

In another embodiment, a system for recovering a service clock at a network node for circuit emulation service over a packet network is provided. The system includes a direct digital synthesis circuit for each port that generates a local service clock signal for each port of the network node. A circuit removes residual time stamp (RTS) values from data packets that are received at the port of the network node. A memory stores the RTS values. A microcontroller uses RTS values stored in the memory over a period of time to generate a number to set the frequency of the direct digital synthesis circuit.

DETAILED DESCRIPTION OF THE INVENTION

Figure 1:
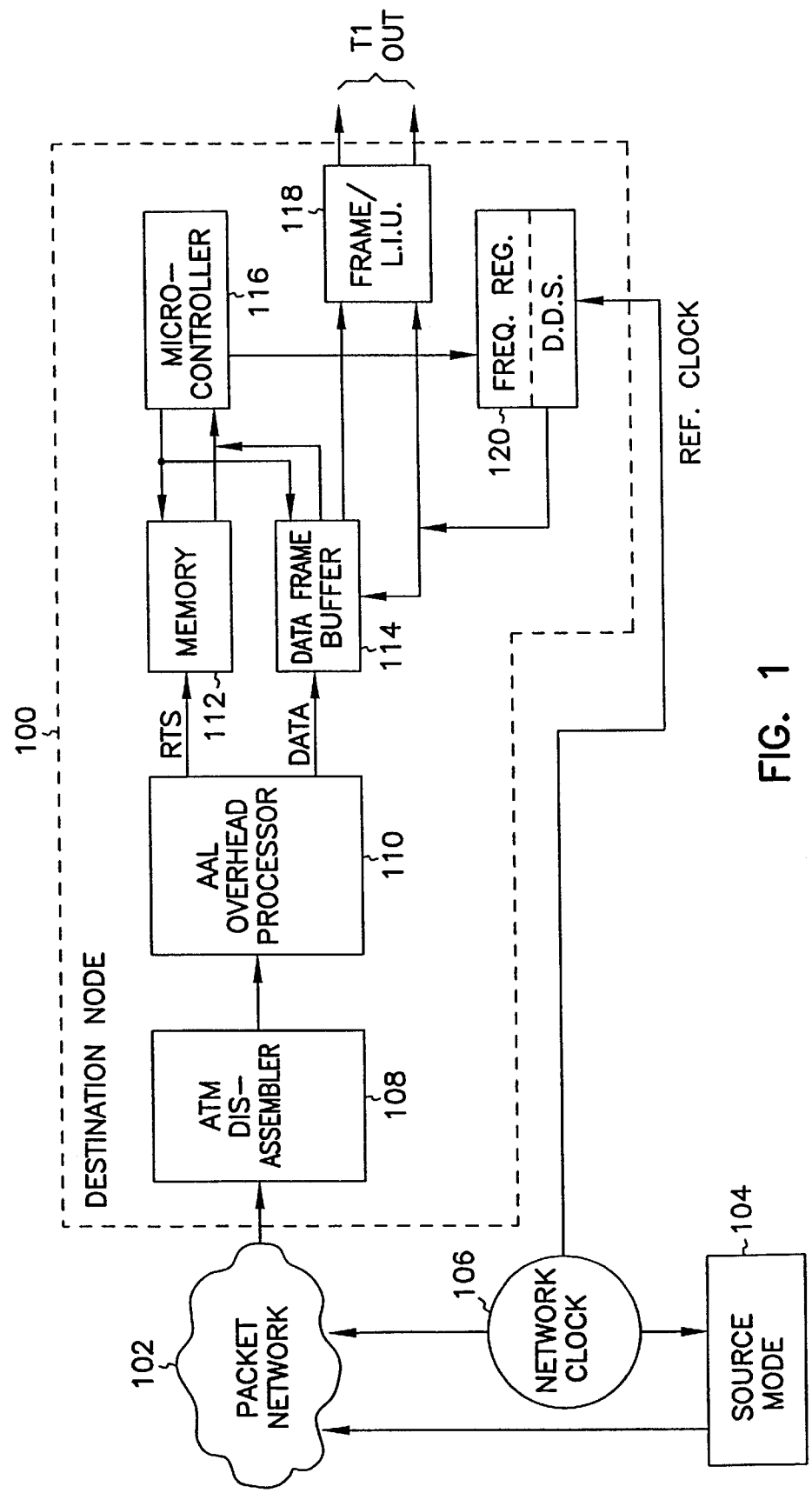
FIG. 1 is a block diagram of an embodiment of a service clock recovery circuit constructed according to the teachings of the present invention.

In the following detailed description of the preferred embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

FIG. 1 is a block diagram of an embodiment of a circuit for recovering a service clock at destination node 100 according to the teachings of the present invention. Destination node 100 receives data packets from source node 104 over packet network 102. Source node 104 includes a service clock that is used to clock data packets for circuit emulation service over network 102. In order to properly process the packets received at destination node 100, destination node 100 needs to "recover" the service clock of source node 104. In other words, destination node 100 needs to locally generate a service clock that is substantially synchronized with the service clock of source node 104 to provide acceptable circuit emulation service.

For simplicity in describing the techniques for service clock recovery, destination node 100 and source node 104 are generally described in the context of a single channel with transmission in a single direction. However, it is understood that both destination node 100 and source node 104 are bi-directional, multi-channel nodes. Thus, in one embodiment, each node of the network includes circuitry of the type described below that is used to synchronize a local service clock for each channel with a service clock at a remote node.

Source node 104 incorporates a signal into the data packets sent to destination node 100 that is used to recover the service clock at destination node 100. For example, source node 104 incorporates "residual time stamp" (RTS) values into the ATM Adaptation Layer of the data packets it transmits as described above. One embodiment of this technique is described in U.S. Pat. No. 5,608,731 entitled Closed Loop Clock Recovery for Synchronous Residual Time Stamp (the '731 Patent). The portion of the '731 Patent that describes the generation of RTS values (including FIG. 1 and Col. 2, line 65 to Col. 3, line 36 of the '731 Patent), is incorporated by reference.

Destination node 100 includes circuitry that is used to remove and process the RTS values to generate a local service clock signal that is synchronized with the service clock at source node 104. ATM disassembler 108 is coupled to receive packets from packet network 102. ATM disassembler 108 disassembles the packets and passes the disassemble packets on to AAL overhead processor 110. AAL overhead processor 110 extracts RTS values and stores the values in memory 112. Further, AAL overhead processor 110 also passes data from the packets to buffer 114. Buffer 114 and memory 112 are both coupled to microcontroller 116.

Microcontroller 116 uses the information in memory 112 and the fill level of buffer 114 to control direct digital synthesis circuit (DDS) 120 to generate a local service clock signal for destination node 100.

Direct digital synthesis circuit 120 comprises a circuit that synthesizes an output sine wave at a frequency that is a fraction of a reference clock or oscillator, e.g., network clock 106. In one embodiment, network clock 106 is the OC-3 byte clock of a packet network. Typically, the output sine wave of direct digital synthesis circuit 120 has a frequency that is less than one-third of the frequency of the reference clock. Conventionally, the fraction used by a direct digital synthesis circuit is established using a large digital number, e.g., 32 bits. This results in a very high resolution on the frequency of the output sine wave. In other words, a direct digital synthesis circuit provides precise control over the frequency of its output signal. It is noted that the frequency stability of a direct digital synthesis circuit is the same as its reference clock. Thus, temperature and aging do not affect its output frequency as would happen with a digitally controlled oscillator of the '731 Patent.

For a direct digital synthesis circuit using an OC-3 byte clock and a 32 bit register, the output clock signal can be set to have a frequency within a tolerance of 5 parts per billion (PPB). The required frequency range for the service clock is ±200 parts per million (PPM), and for T1 the residual time count ranges from 13 to 15. The direct digital synthesis circuit is thus capable of a higher level of precision than the residual time count. Therefore, to more precisely control the service clock frequency, destination node 100 looks at a large sample of RTS values to determine an "interpolated" count value. The interpolated count value is used to calculate a value to write to the register of direct digital synthesis circuit 120 so as to produce a desired, more accurate frequency for the local service clock.

Direct digital synthesis circuit 120 provides this local service clock signal to buffer 114 and frame/line interface unit (frame/LIU) 118. Frame/LIU 118 provides an output signal such as a T1 output. The clock signal from direct digital synthesis circuit 120 controls the rate at which data is processed by buffer 114 and frame/LIU 118. Thus, if the frequency of the signal from direct digital synthesis circuit 120 is too low, the level of data in buffer 114 will increase and, if direct digital synthesis circuit 120 is not adjusted, buffer 114 could overflow and data could be lost. Thus, microcontroller 116 uses both RTS values and buffer fill data to control direct digital synthesis circuit 120.

Microcontroller 116 is programmed to generate a number that sets the frequency of direct digital synthesis circuit 120 based on RTS values stored in memory 112 over a period of time. Further, microcontroller 116 uses an indication of the fill level of buffer 114 to adjust the frequency of direct digital synthesis circuit 120. Advantageously, the use of microcontroller 116 to control direct digital synthesis circuit 120 based on received RTS values and buffer fill levels avoids the complexity of a closed, feedback loop which would need to be replicated for each port of the node. The techniques relating to RTS values and buffer fill levels are described in turn below.

Microcontroller 116 executes a process that effectively interpolates RTS values over a period of time to derive a number that is used to set the output of direct digital synthesis circuit 120. The following derivation is provided to assist in understanding the relationship between the RTS values and the number that is written to the register, FREQ. REG., of direct digital synthesis circuit 120. First, RTS values are generated at source node 104 by running a counter with the network clock. This means that the value in the counter is incremented by 1 every cycle of the network clock. The value in the counter is "latched" or read out of the counter each time the service clock counter at the source node completes a count of Q, e.g., 3008 for T1 and E1 service. This physical relationship can be represented mathematically as shown in Equation 1:

$$\text{TOTAL COUNT} = f_{NET} \cdot T_S \cdot Q = f_{NET} \cdot \frac{Q}{f_S} \tag{1}$$

In Equation 1, the term $f_{NET}$ refers to the frequency of the network clock, e.g., $2.43 \times 10^6$ for T1 and E1 service. $T_S$ is the period of the service clock which is multiplied by a factor, Q. The period of Q service clocks represents the amount of time over which the counter is incremented and the frequency of the network clock represents the number of times per second that the counter is incremented. Thus, the product of these two quantities, $f_{NET}$ and $T_S \cdot Q$, gives the value in the counter.

One underlying assumption in Equation 1 is that the counter has a sufficient number of bits to count the cycles of the network clock during the modified service clock period. However, a 4-bit counter is specified for RTS generation. Thus, when the counter reaches its highest value, i.e., 15 for a 4 bit counter, it wraps back around to zero and starts over again. At the end of Q periods of the service clock, there is a value stored in the counter. This value is the RTS value that is transmitted to destination node 100.

The counter used to generate RTS values is not reset when an RTS value is read out of the counter. For the next RTS value, there is a residual, usually non-zero, value in the counter. Thus, consecutive RTS values typically are not the same. However, for simplicity in the derivation, RTS values will be considered to be 16 minus the difference between consecutive readings of the counter, taking into consideration that the counter wraps back around to zero when it reaches 15. For example, consecutive counter values of 14, 12, 10, 8, and 6 will be treated as five consecutive RTS values of 14.

Equation 1 can be modified to account for the wrapping nature of a P-bit counter as shown in Equation 2.

$$RTS = \left( \frac{f_{NET} \cdot \frac{Q}{f_S}}{2^P} - \text{NUMBER OF WRAPS} \right) \times 2^P \tag{2}$$

In Equation 2, the first term represents the number of times that a P-bit counter will roll over in generating an RTS value, plus a decimal residue. This term is a rational number, i.e., including a value to the right of the decimal. Thus, the difference of the two terms in the parenthesis gives a fractional value that is proportional to the value in the P-bit counter, the residue, when it was latched by the modified service clock. When this value is multiplied by $2^P$, the result is the value of the 4-bit counter if the counter had been set to zero prior to count period. NUMBER OF WRAPS is the number of times that the 4-bit counter wraps for Q periods of the service clock. For T1 service, NUMBER OF WRAPS is 295 and for E1 service NUMBER OF WRAPS is 223.

Equation 2 can be manipulated to derive an equation for the service clock frequency, $f_S$, as a function of interpolated RTS values (RTS'), $f_S = F(RTS')$ as shown in Equation 3.

$$f_S = F(RTS') = \frac{f_{NET} \cdot Q}{2^P} \Big/ \left( \frac{RTS'}{2^P} + \text{NUMBER OF WRAPS} \right) \tag{4}$$

Using Equation 3, destination node 100 can recover the service clock frequency of source node 104 using only the RTS values.

As described above, a direct digital synthesis circuit produces a signal with a frequency that is a fraction of a reference clock. This is represented in equation 4:

$$f = \frac{x}{2^n} \cdot f_{REF} \tag{4}$$

In equation 4, the value X represents the value that is written to the direct digital synthesis circuit to set the frequency of its output. The number n is the number of bits in the value to be written and $f_{REF}$ is the frequency of the reference clock. Equation 4 can be solved for X in terms of the frequency of the service clock as shown in Equation 5:

$$X = \frac{2^n}{f_{REF}} F(RTS') \tag{5}$$

In this equation, the desired frequency (f) has been replaced with the expression F(RTS'). Thus, Equation 5 provides a relationship between the number to be written to the register of the direct digital synthesis circuit that is based entirely on the RTS values.

Advantageously, microcontroller 116 processes a large number of RTS values before adjusting the setting of direct digital synthesis circuit 120. For example, in one embodiment, microcontroller 116 looks at approximately 500 samples of RTS to determine a value X to be written to the register of direct digital synthesis circuit 120. In determining this value, microcontroller 116 uses Equation 6 to determine an interpolated value of RTS, RTS', to be used in calculating the value of X with Equation 5.

$$RTS' = \frac{Nx + My}{x + y} \tag{6}$$

Equation 6 represents a calculation of the mean RTS value when there are x RTS values of N (majority count) and y RTS values of M (minority count), with x greater than y. By processing a large number of samples, direct digital synthesis circuit 120 can be controlled to produce a reference clock with an accuracy of approximately 0.1 PPM, assuming that the network clock frequencies are the same at source node 104 and destination node 100.

Microcontroller 116 can implement Equation 5 without the need to use floating point calculations. For example, Equation 5 can be modified as follows for delivering T1 service with a reference clock that is 19.44 MHZ:

$$X = \frac{48{,}128 \times 8{,}192 \times 4{,}096}{RTS' + 4{,}720} \qquad (7)$$

By limiting the equation to integer values, floating point calculation can be avoided. In other embodiments, floating point calculations can be used when an appropriate processor is available.

As mentioned above, microcontroller 116 uses the average buffer fill level data to calculate a more optimum setting of direct digital synthesis circuit 120. Microcontroller 116 analyzes the buffer fill levels to evaluate three related aspects of the operation of destination node 100. First, microcontroller 116 uses the buffer fill level data to monitor the quality of the RTS' service clock recovery for a particular port described above. Further, microcontroller 116 uses the buffer fill level data across all ports to analyze for possible differences in the network clock at the source and destination nodes. Finally, microcontroller 116 uses the buffer fill level data to calculate Cell Delay Variation at a particular port of the destination node to determine an optimum level for that port. Each of these functions of microcontroller 116 are discussed, in turn, below.

Microcontroller 116 analyzes the buffer fill levels for each port of a destination node to assist in synchronizing the service clock at destination node 100 with the service clock at the source node for the port. In one embodiment, microcontroller 116 receives an update on the fill level of buffer 114 with the arrival of each new cell. If the service clock for a port of destination node 100 is substantially synchronized with the service clock of source node 104, then the average fill level of buffer 114 should remain approximately constant over time since data packets are being generated at source node 104 and processed at destination node 100 at the approximately the same speed. However, as mentioned, network 102 can introduce a variable delay for each packet it transports between source node 102 and destination node 100. This delay is typically referred to as "cell jitter" or "cell delay variation." To account for this cell delay variation, microcontroller 116 looks at the buffer fill level for a period of time before making an adjustment, if any, to the setting of direct digital synthesis circuit 120. For example, microcontroller 116 can average the buffer fill level data over a period of 10 seconds for T1 service.

With T1 service, if the service clock at the destination node is in error by −1 PPM, then the average buffer fill level for a port will increase by 1 byte in approximately 5.18 seconds. With this information, microcontroller 116 can determine an appropriate offset for direct digital synthesis circuit 120 so as to synchronize the local service clock with the service clock at source node 104. If the buffer fill level is increasing, then the service clock speed is increased so that packets are processed faster. If, however, the buffer fill level is decreasing then the service clock speed is decreased so that packets are processed slower.

Microcontroller 116 also analyzes the buffer fill level data over all ports on destination node 100 to detect an error in network clocks between source and destination nodes. When a significant correlation in drift of the buffer fill levels of all ports is detected, a correction can be added to the setting of direct digital synthesis circuit 120 to compensate for the difference in network clock frequencies. Such differences may be due, for example, to not having a common network reference clock at the source and destination nodes. Microcontroller 116 can use this correction factor for each port of destination node 100.

Finally, microcontroller 116 also analyzes the buffer fill level data to determine an optimal operating point for a buffer for a particular port. Microcontroller 116 uses the information provided by buffer 114 to determine cell-to-cell delay variation. Further, microcontroller 116 uses the extremes of cell delay variation to determine peak-to-peak cell delay variation. With this information, microcontroller 116 can set the frequency of direct digital synthesis circuit 120 to achieve an average buffer fill level that accommodates the expected peak-to-peak cell delay variation, without adding excess cell delay.

Advantageously, by averaging the buffer fill level data for 10 seconds before adjusting the direct digital synthesis circuit in each of the above operations, the maximum wander component frequency that can be found on the output of the local service clock is 0.05 Hz.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the service clock recovery technique can be used for other services, e.g., E1 and other conventional continuous bit rate services, and this application is not limited to use with T1 service. Further, in some embodiments, the microcontroller uses only the buffer fill level data to adjust the setting of the direct digital synthesis circuit, in situations where SRTS is not supported. In other embodiments, only the RTS values are used.

What is claimed is:

1. A method for synchronizing a service clock at a destination node with a service clock at a source node for circuit emulation service over a packet network, the method comprising:

receiving data packets from a source node at at least one port of the destination node;

at the destination node, removing from the data packets residual time stamp (RTS) values that were created at the source node based on at least the service clock at the source node;

determining a majority count and a minority count of occurrences of RTS values of a period of time based on the RTS values removed from the data packets; and using the majority and minority counts to set the frequency of a service clock at the destination node for use in receiving data packets.

2. The method of claim 1, and further monitoring the fill level of a buffer associated with the at least one port of the destination node to determine whether to adjust the frequency of the service clock.

3. The method of claim 2, wherein:

when the average fill level decreases over time, decreasing the frequency of the service clock at the destination node; and when the average fill level increases over time, increasing the frequency of the service clock at the destination node.

4. The method of claim 2, wherein monitoring the fill level of the buffer comprises averaging the buffer fill level of each of the ports of the destination node for at least 10 seconds.

5. The method of claim 1, using the majority and minority counts for the plurality of time periods to calculate a control value to set the frequency of a service clock at the destination node for use in receiving data packets comprises calculating an n-bit $$X = \frac{2^n}{f_{REF}} F(RTS')$$

number, X, for a direct digital synthesis circuit using the following equation:

wherein F(RTS') is a function that relates the frequency at the source node to the removed RTS values over a period of time.

6. A method for synchronizing a service clock at a destination node in a packet switch network wherein packets are transmitted from a source node to a destination node and wherein the source node calculates and transmits residual time stamp (RTS) values in the data packets, the method comprising:

removing RTS values from data packets at the destination node; and counting selected RTS values removed over a period of time to set a direct digital synthesis circuit to act as the service clock for the destination node with a frequency that is substantially synchronized with a service clock at the source node.

7. The method of claim 6, and further monitoring the fill level of a buffer associated with the at least one port of the destination node to determine whether to adjust the frequency of the service clock.

8. The method of claim 7, wherein:

when the average fill level decreases over time, decreasing the frequency of the service clock at the destination node; and when the average fill level increases over time, increasing the frequency of the service clock at the destination node.

9. The method of claim 7, wherein monitoring the fill level of the buffer comprises averaging the buffer fill level of each of the ports of the destination node for period of time.

10. The method of claim 7, further comprising compensating for the difference in network clocks between source and destination nodes by selectively adding a correction to the setting of the direct digital synthesis circuit when a significant correlation in drift of the buffer fill levels of each of the ports of the destination node is detected.

11. The method of claim 7, further comprising setting the frequency of the direct digital synthesis circuit to achieve an average buffer fill level that accommodates an expected peak-to-peak cell delay variation, without adding excess cell delay.

12. The method of claim 11, wherein setting the frequency of the direct digital synthesis circuit comprises:

determining cell-to-cell delay variation; and determining peak-to-peak cell delay variation based on extremes of cell-to-cell delay variation.

13. A method for synchronizing a service clock at a destination node in a packet switch network wherein packets are transmitted from a source node to a destination node and wherein the source node calculates and transmits residual time stamp (RTS) values in the data packets, the method comprising:

removing RTS values from data packets at the destination node;

using RTS values over a period of time to set a direct digital synthesis circuit to act as the service clock for the destination node with a frequency that is substantially synchronized with a service clock at the source node; and wherein using the RTS values to set the direct digital synthesis circuit comprises generating an n-bit number and providing the n-bit number to the direct digital synthesis circuit.

14. The method of claim 13, wherein the destination node calculates the value of the n-bit number using non-floating point calculations.

15. The method of claim 13, and further monitoring the fill level of a buffer associated with the at least one port of the destination node to determine whether to adjust the frequency of the service clock.

16. The method of claim 15, wherein:

when the average fill level decreases over time, decreasing the frequency of the service clock at the destination node; and when the average fill level increases over time, increasing the frequency of the service clock at the destination node.

17. The method of claim 15, wherein monitoring the fill level of the buffer comprises averaging the buffer fill level of each of the ports of the destination node for a period of time.

18. A system for recovering a service clock at a network node for circuit emulation service over a packet network, the system comprising:

a direct digital synthesis circuit for each port that generates a local service clock signal for each port of the network node;

a circuit, coupled to a port of the network node, that removes residual time stamp (RTS) values from data packets that are received at the port of the network node; and a microcontroller that uses the RTS values removed over a period of time to generate a number to set the frequency of the direct digital synthesis circuit.

19. The system of claim 18, and further comprising a buffer associated with each port, wherein the microcontroller further monitors the fill level of the buffer to determine whether to adjust the frequency of the direct digital synthesis circuit for each port.

20. The system of claim 18, wherein the microcontroller generates an n-bit number, X, to set the frequency of the direct digital synthesis circuit according to the following equation:

$$X = \frac{2^n}{f_{REF}} F(RTS')$$

wherein F(RTS') is a function that relates the frequency at the source node to the removed RTS values over a period of time.

21. The system of claim 20, wherein the microcontroller calculates F(RTS')

$$F(RTS') = \frac{\frac{f_{NET} \cdot Q}{2^P}}{\frac{RTS'}{2^P} + \text{NUMBER OF WRAPS}}$$

according to the following equation:
wherein RTS' represents the RTS values over a period of time, P is the number of bits in the counter used to generate the RTS values, fNET is the frequency of the network clock, Q is a factor by which the service clock is divided at the source node when generating the RTS values, and NUMBER OF WRAPS is an integer number of the complete cycles of the RTS counter in Q service clock cycles.

22. The system of claim 21, wherein the microcontroller calculates RTS' from removed RTS values using the following equation:

$$RTS' = \frac{Nx + My}{x + y}$$

wherein a majority (x) of the RTS values have a value N and a minority (y) of the RTS values (y) have a value M.

23. The system of claim 18, wherein:

$$X = \frac{48{,}128 \times 8{,}192 \times 4{,}096}{RTS' + 4{,}720}$$

wherein X is the number used to set the direct digital synthesis circuit for T1 service and RTS' tracks the RTS values over a period of time.

24. A method for service clock recovery, the method comprising:
removing RTS values from data packets at the destination node; and
counting selected RTS values removed over a period of time to set the service clock for the destination node.

25. The method of claim 24, wherein using the removed RTS values comprises determining a majority and a minority count of RTS values over a period of time to set the frequency of the service clock.

26. The method of claim 24, and further using buffer fill levels to adjust the local service clock.

27. The method of claim 24, further comprising storing the removed RTS values in memory at the destination node.

28. A network node coupleable to a packet network, the network node comprising:
a packet disassembler having an input coupleable to the packet network;
an overhead processor, coupled to the packet disassembler, that removes data and residual time stamp (RTS) values from data packets received at the input;
a memory, coupled to the overhead processor, that stores the RTS values;
a data buffer, coupled to the overhead processor, that receives the data from the packets;
a direct digital synthesis circuit, coupled to the data buffer, that generates a local service clock signal; and
a microcontroller coupled to the direct digital synthesis circuit, wherein the microcontroller controls the direct digital synthesis circuit to generate the local service clock signal.

29. The network node of claim 28, further comprising a line interface unit, coupled to the data buffer.

30. The network node of claim 28, wherein the microcontroller is further responsive to a fill level of the data buffer to adjust a control signal provided to the direct digital synthesis circuit.

31. The network node of claim 28, wherein the microcontroller uses RTS values stored in the memory over a period of time to generate a number to set the frequency of the direct digital synthesis circuit.

32. The network node of claim 28, wherein the microcontroller generates an n-bit number, X, to set the frequency of the direct digital synthesis circuit according to the following equation:

$$X = \frac{2^n}{f_{REF}} F(RTS')$$

wherein F(RTS') is a function that relates the frequency at the source node to the stored RTS values over a period of time.

33. The system of claim 32, wherein the microcontroller calculates F(RTS') according to the following equation:

$$F(R'TS) = \frac{\frac{f_{NET} \cdot Q}{2^P}}{\frac{RTS'}{2^P} + \text{NUMBER OF WRAPS}}$$

wherein RTS' represents the RTS values over a period of time, P is the number of bits in the counter used to generate the RTS values, fNET is the frequency of the network clock, Q is a factor by which the service clock is divided at the source node when generating the RTS values, and NUMBER OF WRAPS is an integer number of the complete cycles of the RTS counter in Q service clock cycles.

34. The system of claim 28, wherein the microcontroller calculates RTS' from stored RTS values using the following equation:

$$RTS' = \frac{Nx + My}{x + y}$$

wherein a majority (x) of the RTS values have a value N and a minority (y) of the RTS values (y) have a value M.

35. The system of claim 28, wherein:

$$X = \frac{48{,}128 \times 8{,}192 \times 4{,}096}{R'TS + 4{,}720}$$

wherein X is the number used to set the direct digital synthesis circuit for T1 service and RTS' tracks the RTS values over a period of time.

36. A method for controlling a local clock in a destination node coupled to a packet network, the method comprising:
counting selected RTS values stored over a period of time to set a direct digital synthesis circuit to act as the service clock for the destination node with a frequency that is substantially synchronized with a service clock at a source node.

37. The method of claim 36, and further comprising storing the RTS values over the period of time.

* * * * *